United States Patent
Henry et al.

(10) Patent No.: US 10,598,070 B2
(45) Date of Patent: Mar. 24, 2020

(54) NO/NO₂ RATIO ADJUSTMENT USING NON-THERMAL PLASMA

(71) Applicant: Southwest Research Institute, San Antonio, TX (US)

(72) Inventors: Cary A. Henry, Helotes, TX (US); Scott T. Eakle, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 63 days.

(21) Appl. No.: 15/941,703

(22) Filed: Mar. 30, 2018

(65) Prior Publication Data

US 2019/0301339 A1   Oct. 3, 2019

(51) Int. Cl.
*F01N 9/00* (2006.01)
*F01N 3/20* (2006.01)
*F01N 11/00* (2006.01)

(52) U.S. Cl.
CPC ........... *F01N 9/007* (2013.01); *F01N 3/20* (2013.01); *F01N 11/007* (2013.01);
(Continued)

(58) Field of Classification Search
CPC ........ F01N 9/00; F01N 9/007; F01N 2240/28; F01N 2560/026; B01D 2259/818; F23J 2219/201
See application file for complete search history.

(56) References Cited

U.S. PATENT DOCUMENTS

| | | | | |
|---|---|---|---|---|
| 2,274,666 A | * | 3/1942 | Clarke | C10L 1/231 44/414 |
| 2003/0221414 A1 | * | 12/2003 | Kim | F01N 3/0892 60/275 |

(Continued)

OTHER PUBLICATIONS

Jaffre, Y.N., et al; "Non-Thermal Plasmas for NOx Treatment;" HAL Archives-ouvertes.fr; HAL Id: hal-00410200 https://hal.archives-ouvertes.fr/hal-00410200; Submitted on Aug. 18, 2009 (7 pgs).

(Continued)

*Primary Examiner* — Audrey K Bradley
(74) *Attorney, Agent, or Firm* — Grossman, Tucker, Perreault & Pfleger, PLLC

(57) ABSTRACT

The systems and methods described herein beneficially provide an exit gas having a third, relatively low, NO/NO₂ ratio that closely approximates the NO/NO₂ ratio found in the exhaust of various internal combustion engines. The systems and methods described herein receive a feed gas having a first, relatively high NO/NO₂ ratio. The feed gas is apportioned into a first feed gas portion that is passed through a non-thermal plasma generation system to provide an intermediate gas having a second, relatively very low, NO/NO₂ ratio and a second feed gas portion having the first NO/NO₂ ratio. The intermediate gas and the second feed gas portion are combined to provide the exist gas having the third, relatively low, NO/NO₂ ratio. The systems and methods described herein beneficially provide an exit gas having a variable NO/NO₂ ratio to simulate exhaust from a variety of internal combustion engines.

5 Claims, 4 Drawing Sheets

(52) U.S. Cl.
CPC .... *B01D 2259/818* (2013.01); *F01N 2240/28* (2013.01); *F01N 2560/026* (2013.01)

(56) References Cited

U.S. PATENT DOCUMENTS

| | | | |
|---|---|---|---|
| 2005/0217241 A1* | 10/2005 | Nakanishi | F01N 3/0814 60/275 |
| 2006/0213187 A1* | 9/2006 | Kupe | B01D 53/9431 60/286 |
| 2009/0019844 A1* | 1/2009 | Hirata | B01D 46/0063 60/311 |
| 2014/0010748 A1* | 1/2014 | Kim | B01D 53/8625 423/239.1 |
| 2017/0284260 A1* | 10/2017 | Lee | F01N 3/36 |

OTHER PUBLICATIONS

Ruma, et al; "A Survey of Non-Thermal Plasma and Their Generation Mehods;" BRCorp; International Journal of Renewable Energy and Environmental Engineering; vol. 4, No. 1, Jan. 2016; pp. 006-012.

* cited by examiner

NO/NO$_2$ RATIO ADJUSTMENT USING NON-THERMAL PLASMA

TECHNICAL FIELD

The present disclosure relates to adjusting the NO/NO$_2$ concentration ratio in a gas stream, more specifically to adjusting the NO/NO$_2$ concentration ratio using a non-thermal plasma generator.

A method to generate an exit gas having a defined exit NO/NO$_2$ ratio, the method comprising apportioning a feed gas having a first NO/NO$_2$ ratio into a first feed gas portion and a second feed gas portion, flowing the first feed gas portion through a non-thermal plasma generator and converting, via the non-thermal plasma generator, at least a portion of NO present in the first feed gas portion to NO$_2$ to provide an intermediate gas having a second NO/NO$_2$ ratio. One may selectively adjust a flow of the second feed gas portion through a bypass around the non-thermal plasma generator and combine the intermediate gas with the second feed gas portion to provide an exit gas having the defined exit NO/NO$_2$ ratio.

BACKGROUND

Oxides of nitrogen (NO$_x$) represent a significant pollutant that is regulated across the globe. The mitigation of NO$_x$ generated by internal combustion engines is a primary function of catalytic aftertreatment systems. Different engine types and different fuels produce exhaust having different NO$_x$ levels and different constituent component concentrations contributing to NO$_x$. To evaluate the performance of such catalytic aftertreatment systems, it is necessary to control the amount of NO$_x$ present in the exhaust sample. However, since NO$_x$ includes both nitrogen oxide (NO) and nitrogen dioxide (NO$_2$), simply controlling the overall NO$_x$ concentration is inadequate to evaluate the performance of a catalyst or catalytic aftertreatment system. To properly develop emission control systems, it is necessary to specifically control the appropriate NO/NO$_2$ concentration ratio in the exhaust such that the test exhaust composition produced by a reactor represents the true composition of the actual exhaust produced by an internal combustion engine.

SUMMARY

A NOx conversion system comprising a feed gas collector, a non-thermal plasma generator disposed in the feed gas collector, a bypass disposed around the non-thermal plasma generator, and a flow control device disposed in the bypass

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
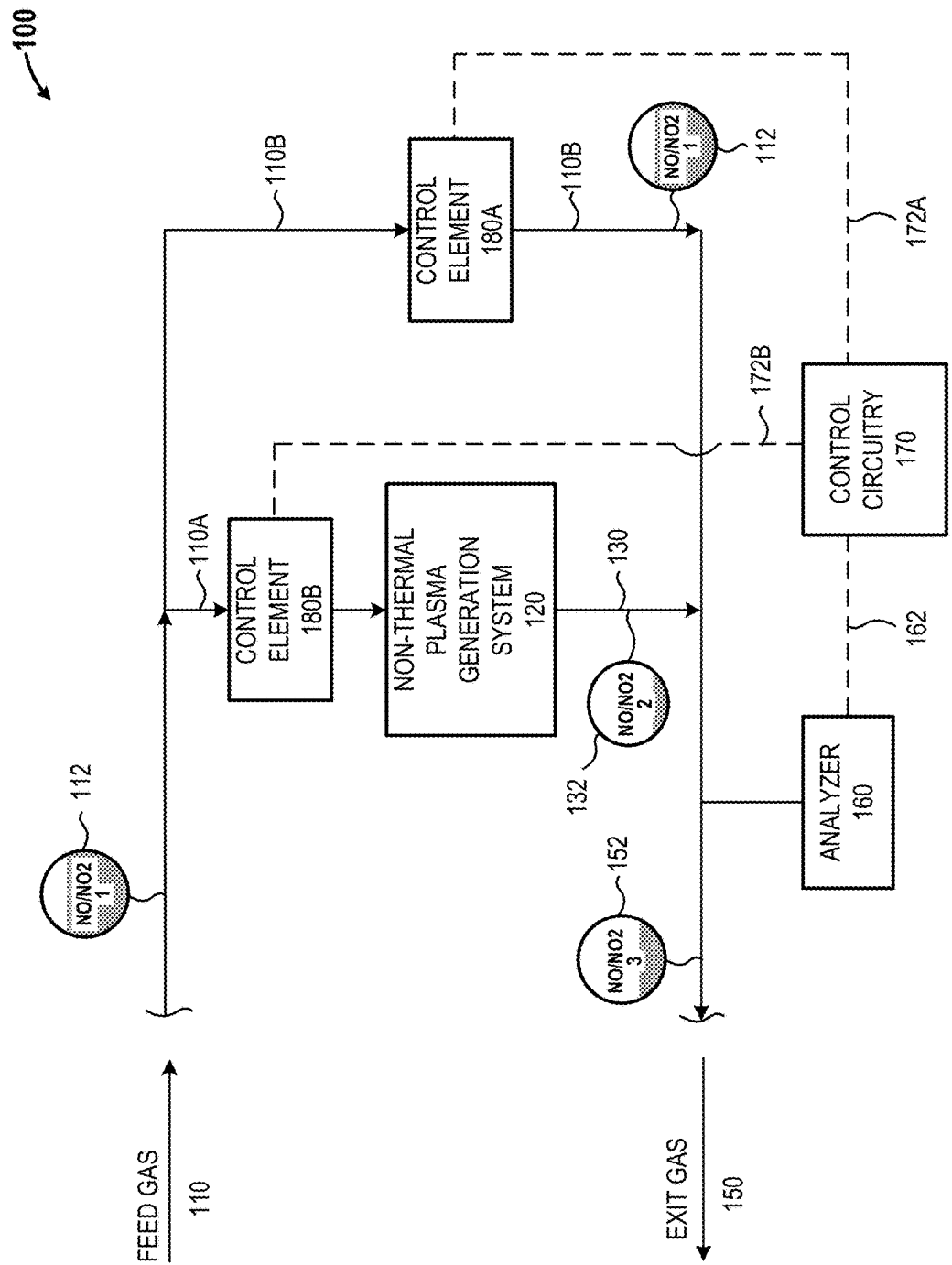
FIG. 1 is a block diagram of an illustrative NO/NO$_2$ ratio adjustment system in which the relatively high NO/NO$_2$ ratio present in a feed gas is selectively adjusted using a non-thermal plasma generation system to produce an exit gas having a defined, relatively low, exit NO/NO$_2$ ratio, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein modify the composition of a gas stream to provide a desired NO content, a desired NO$_2$ content, and/or a desired NO/NO$_2$ concentration ratio by non-thermally oxidizing at least a portion of the NO present in the gas stream to NO$_2$ using a non-thermal plasma generation system. In one or more applications, the gas stream may include a combustion exhaust gas, such as an internal combustion engine exhaust, that contains NO and NO$_2$ at a concentration ratio unfavorable to catalytic treatment of the combustion exhaust gas prior to atmospheric discharge. In addition, the gas stream may include the combustion exhaust gas produced by a combustion reactor that provides the exhaust conditions of an internal combustion engine. Such reactor may include a computer controlled multi-fuel continuous flow reactor that may also be utilized for catalyst performance evaluation and screening.

In such applications, a portion of the combustion exhaust gas may be directed through a non-thermal plasma generation system to produce a modified exhaust gas having an NO/NO$_2$ concentration ratio more favorable to catalytic treatment. In other applications, the gas stream may include a test exhaust gas that includes NO and NO$_2$ produced by the combustion of one or more compounds such as nitromethane or nitroethane under controlled conditions in a combustion reactor. In such applications, it may be desirable to test different catalytic treatment systems to reduce pollutants in the test exhaust gas using a test exhaust gas in which the NO/NO$_2$ concentration ratio mimics the exhaust composition produced by various internal combustion engines. The systems and methods described herein beneficially and advantageously permit the adjustment of one or more of: NO concentration, NO$_2$ concentration, and/or NO/NO$_2$ concentration ratio in the test exhaust gas to mimic an internal combustion engine exhaust. Further, the use of a non-thermal plasma generator does not thermally oxidize or convert other constituent components in the gas stream.

A gas becomes a plasma when the addition of energy causes a significant number of atoms to release some or all of their electrons. In a non-thermal plasma, the electron temperature is maintained above the temperature of the ionized gas itself. Generally, the electrons in a non-thermal plasma are accelerated using an applied electric field. Non-thermal plasma generation systems may employ a variety of generation processes or methods including, but not limited to: DC glow discharge, radio frequency (RF) discharge, dielectric barrier discharge, atmospheric pressure plasma jet, microwave, and pulse power discharge.

The systems and methods described herein apportion a feed gas stream (e.g., an exhaust gas stream) into a first gas portion that passes through the non-thermal plasma generation system and a second gas portion that bypasses (i.e., does not pass through) the non-thermal plasma generation system. The non-thermal plasma generation system oxidizes at least a portion of the NO present in the first gas portion to $NO_2$. By recombining the first gas portion with the second gas portion, the NO concentration, the $NO_2$ concentration, and/or the $NO/NO_2$ concentration ratio in the combined gas may be adjusted to a defined value to provide an exit gas having a known $NO_x$ (NO, $NO_2$) composition. A flow control element positioned in the second gas portion flowpath may control the apportionment of the gas into the first gas portion and the second gas portion. A flow control element positioned in the first gas portion flowpath may alternatively or additionally control the apportionment of the gas into the first gas portion and the second gas portion.

A feedback control system may employ a gas analyzer fluidly coupled to the exit gas to monitor the NO concentration, the $NO_2$ concentration, and/or the $NO/NO_2$ ratio in the exit gas. Based on the exit gas composition, a controller coupled to the gas analyzer may adjust the apportionment of the first gas portion and/or the second gas portion to achieve the defined exit gas composition.

A feed-forward control system may employ a gas analyzer fluidly coupled to the feed gas to monitor the NO concentration, the $NO_2$ concentration, and/or the $NO/NO_2$ ratio in the feed gas. Based on the feed gas composition, a controller coupled to the gas analyzer may adjust the apportionment of the first gas portion and/or the second gas portion to achieve the defined exit gas composition.

An NOx conversion system is provided. The NOx conversion system may include: a feed gas collector; a non-thermal plasma generator disposed in the feed gas collector; a bypass disposed around the non-thermal plasma generator; and a flow control device disposed in the bypass.

A method to generate an exit gas having a defined exit $NO/NO_2$ ratio is provided. The method may include: apportioning a feed gas having a first $NO/NO_2$ ratio into a first feed gas portion and a second feed gas portion; flowing the first feed gas portion through a non-thermal plasma generator; converting, via the non-thermal plasma generator, at least a portion of NO present in the first feed gas portion to $NO_2$ to provide an intermediate gas having a second $NO/NO_2$ ratio; selectively adjusting a flow of the second feed gas portion through a bypass around the non-thermal plasma generator; and combining the intermediate gas with the second feed gas portion to provide an exit gas having the defined exit $NO/NO_2$ ratio.

A system to generate an exit gas having a defined exit $NO/NO_2$ concentration ratio is provided. The system may include: means for apportioning a feed gas having a first $NO/NO_2$ ratio into a first feed gas portion and a second feed gas portion; means for non-thermally converting at least a portion of NO present in the first feed gas portion to $NO_2$ to provide an intermediate gas having a second $NO/NO_2$ ratio; means for selectively adjusting a flow of the second feed gas portion through a bypass around the non-thermal plasma generator; and means for combining the intermediate gas with the second feed gas portion to provide an exit gas having the defined exit $NO/NO_2$ ratio.

FIG. 1 is a block diagram of an illustrative $NO/NO_2$ ratio adjustment system 100 in which the relatively high $NO/NO_2$ ratio 112 of a feed gas 110 is selectively adjusted using a non-thermal plasma generation system 120 to produce an exit gas 150 having a defined, relatively low, final $NO/NO_2$ ratio 152, in accordance with at least one embodiment described herein. The feed gas 110 includes nitrogen oxides ($NO_x$), at a first, relatively high, $NO/NO_2$ ratio 112. The feed gas 110 is selectively apportioned into a first feed gas portion 110A and a second feed gas portion 110B. At least a portion of the first feed gas portion 110A passes through the non-thermal plasma generation system 120 where at least a portion of the NO in the first feed gas portion 110A is oxidized to $NO_2$ to provide an intermediate gas 130 having a second, relatively very low, $NO/NO_2$ ratio 132. The second feed gas portion 110B, with the first, relatively high, $NO/NO_2$ ratio 112, selectively bypasses the non-thermal plasma generation system 120 and is mixed with the intermediate gas 130 to provide the exit gas 150 having a defined, relatively low, exit $NO/NO_2$ ratio 152.

A gas analyzer 160 fluidly couples to the exit gas 150. The gas analyzer 160 measures one or more of: the NO concentration in the exit gas 150; the $NO_2$ concentration in the exit gas 150; and/or the exit $NO/NO_2$ ratio 152 in the exit gas 150. The gas analyzer 160 generates one or more output signals 162 that are communicated to control circuitry 170. The control circuitry 170 generates an output signal 172A that is communicated to one or more final control elements 180A, 180B. In some embodiments, the final control element 180A may be disposed in the flow path of the second feed gas portion 110B. The final control element 180A selectively controls the volume of the second feed gas portion 110B permitted to bypass the non-thermal plasma generation system 120. In some embodiments, the final control element 180B may be disposed in the flow path of the first feed gas portion 110A.

In embodiments, the control circuitry 170 may selectively adjust the volume of the second feed gas portion 110B, such that when the second feed gas portion 110B is combined with the intermediate gas 130 from the non-thermal plasma generation system 120, an exit gas 150 having a defined exit $NO/NO_2$ ratio 152 is formed. In other embodiments, the control circuitry 170 may selectively adjust the volume of the first feed gas portion 110A, such that when the intermediate gas 130 from the non-thermal plasma generation system 120 is combined with the second feed gas portion 110B an exit gas 150 having the defined exit $NO/NO_2$ ratio 152 is formed.

The feed gas 110 includes NO and $NO_2$ at a first, relatively high, $NO/NO_2$ ratio 112. In embodiments, the feed gas 110 may include an exhaust gas generated by an internal combustion engine. The feed gas 110 may have a $NO_x$ concentration of from about 20 parts per million by volume (ppmv) to about 3,000 ppmv; about 20 ppmv to about 2,000 ppmv; about 20 ppmv to about 1,000 ppmv; or about 20 ppmv to about 500 ppmv. In embodiments, the feed gas 110 may have a relatively high $NO/NO_2$ ratio 112 of: about 10.0 or greater; about 5.0 or greater; about 2.5 or greater; about 1.00 or greater; or about 0.5 or greater. In embodiments, other chemical compounds, such as carbon monoxide, carbon dioxide, $C_{2+}$ hydrocarbons, and/or sulfur oxides ($SO_x$) may be present in the feed gas 110.

The non-thermal plasma generation system 120 may include any number and/or combination of currently available and/or future developed systems or devices capable of generating a non-thermal plasma to oxidize and/or convert at least some of the NO present in the first exhaust gas portion 110A to $NO_2$. In embodiments, the non-thermal plasma generation system 120 may produce a plasma via an electron beam, a dielectric barrier discharge, or a pulsed corona discharge. For example, the non-thermal plasma generation system 120 may employ a dielectric barrier discharge plasma generated by supplying an alternating current at a relatively high voltage (e.g., 10 to 20 kV) and at a frequency of 50 Hz to 2 kHz to spaced apart electrodes coated with a thin layer of dielectric material.

As the first feed gas portion 110A passes through the non-thermal plasma generation system 120, some or all of the NO in the first feed gas portion 110A is converted to $NO_2$. In embodiments, the non-thermal plasma generation system 120 may have an NO→$NO_2$ conversion efficiency of: about 50% or greater; about 70% or greater; about 90% or greater; about 95% or greater; or about 99% or greater. Thus, the intermediate gas 130 exiting the non-thermal plasma generation system 120 may have a relatively very low NO/$NO_2$ ratio 132. In embodiments, the intermediate gas 130 may have a NO/$NO_2$ ratio 132 of: about 5 or less; about 2.5 or less; about 1 or less; about 0.5 or less; about 0.1 or less; about 0.05 or less; or about 0.01 or less.

The second feed gas portion 110B bypasses the non-thermal plasma generation system 120. A final control element 180A may be used to control the apportionment of the feed gas 110 to the first feed gas portion 110A and the second feed gas portion 110B. As the pressure drop across the final control element 180A increases, a greater volume of feed gas 110 will be preferentially apportioned to the first feed gas portion 110A and a lesser volume of feed gas 110 will be apportioned to the second feed gas portion 110B. Conversely, as the pressure drop across the final control element 180A decreases, a greater volume of feed gas 110 will be preferentially apportioned to the second feed gas portion 110B and a lesser volume of feed gas 110 will be apportioned to the first feed gas portion 110A. The NO/$NO_2$ ratio 112 in the second feed gas portion 110B is the same as the NO/$NO_2$ ratio 112 in the feed gas 110.

The final control element 180A may include any number and/or combination of currently available and/or future developed devices or systems capable of adjusting, controlling, or otherwise altering the volume of feed gas 110 in the second feed gas portion 110B that bypasses the non-thermal plasma generation system 120. The control circuitry 170 may alter, adjust, or control the apportionment of the feed gas 110 to the first feed gas portion 110A and the second feed gas portion 110B to achieve the defined exit NO/$NO_2$ ratio 152 in exit gas 150. In embodiments, the final control element 180A may include one or more devices or systems capable of selectively providing a variable cross-section orifice. In embodiments, the final control element 180A may include one or more flow control valves capable of selectively controlling the volume of the second feed gas portion 110B through the bypass around the non-thermal plasma generation system 120. The selection of the final control element 180A may be based, at least in part, on: the pressure of the feed gas 110, the flowrate of the feed gas 110, the pressure drop through the bypass around the non-thermal plasma generation system 120, the pressure drop through the non-thermal plasma generation system 120, or combinations thereof.

In some embodiments, a final control element 180B may be additionally or alternatively disposed in the flowpath of the first feed gas portion 110A. The final control element 180B may be used in conjunction with, or as an alternative to, the final control element 180A to control the apportionment of the feed gas 110 to the first feed gas portion 110A and the second feed gas portion 110B.

The final control element 180B may include any number and/or combination of currently available and/or future developed devices or systems capable of adjusting, controlling, or otherwise altering the volume of feed gas 110 in the first feed gas portion 110A to the non-thermal plasma generation system 120. In embodiments, the final control element 180B may include one or more devices or systems capable of selectively providing a variable cross-section orifice. In embodiments, the final control element 180B may include one or more flow control valves capable of selectively controlling the volume of the first feed gas portion 110A through the non-thermal plasma generation system 120. The selection of the final control element 180B may be based, at least in part, on: the pressure of the feed gas 110, the flowrate of the feed gas 110, the pressure drop through the bypass around the non-thermal plasma generation system 120, the pressure drop through the non-thermal plasma generation system 120, or combinations thereof.

The intermediate gas 130 having the relatively very low NO/$NO_2$ ratio 132 is mixed or otherwise combined with the second feed gas portion 110B that bypasses the non-thermal plasma generation system 120 to provide an exit gas 150 having a defined NO/$NO_2$ ratio 152. In embodiments, the exit gas 150 may have an exit NO/$NO_2$ ratio 112 of: about 10.0 or greater; about 5.0 or greater; about 2.5 or greater; about 1.00 or greater; or about 0.5 or greater. In embodiments, the control circuitry 170 may adjust the flow of the first feed gas portion 110A through the non-thermal plasma generation system 120 and/or the flow of the second feed gas portion 110B through the bypass to generate an exit gas having a defined exit NO/$NO_2$ ratio 152 that simulates the exhaust profile from an internal combustion engine. The selective generation of an exit gas 150 having a defined exit NO/$NO_2$ ratio 152 beneficially and advantageously permits the evaluation, testing, and development of emissions treatment and/or control systems, methods, or devices over a large number or range of NO/$NO_2$ ratios.

Figure 2:
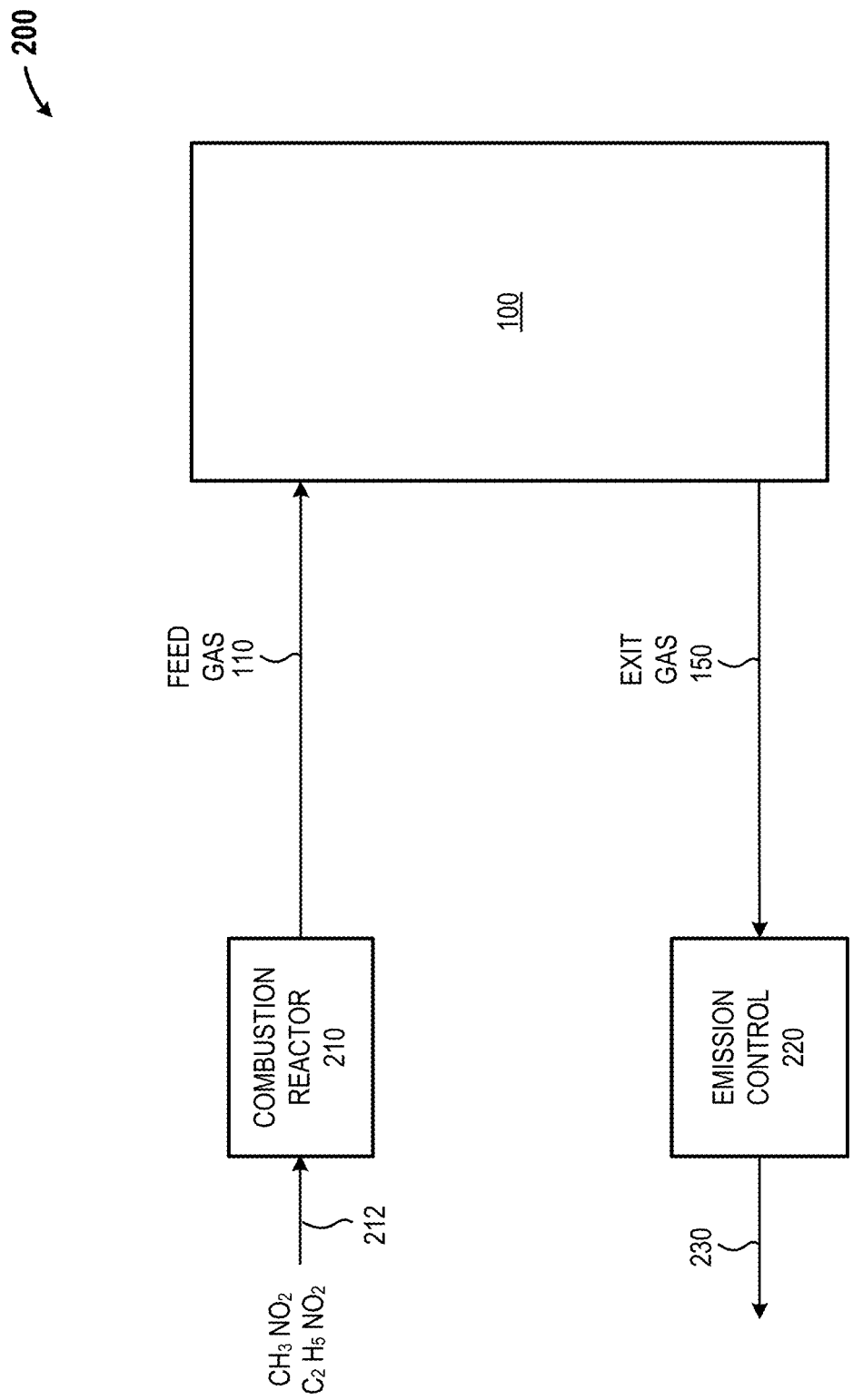
FIG. 2 is a block diagram of an illustrative emissions control test system that includes a combustion reactor to generate the feed gas having a first, relatively high, NO/NO$_2$ ratio, a NO/NO$_2$ ratio adjustment system, and an emissions control system, in accordance with at least one embodiment described herein.

FIG. 2 is a block diagram of an illustrative emissions control test system 200 that includes a combustion reactor 210 to generate the feed gas 110 having a first, relatively high, NO/$NO_2$ ratio 112, a NO/$NO_2$ ratio adjustment system 100, and an emissions control system 220, in accordance with at least one embodiment described herein. The combustion reactor 210 generates the feed gas 110 by combusting a hydrocarbon fuel source, such as natural gas, in the presence of a nitrogen containing compound such as nitroethane or nitromethane 212. The combustion of nitromethane and/or nitroethane 212 creates primarily NO rather than $NO_2$. Since emissions control systems 220 respond differently to NO and $NO_2$, greater accuracy may be made in predicting the performance of the emissions control system 220 if the NO/$NO_2$ ratio 112 in the feed gas is corrected to provide an exit gas 150 having an NO/$NO_2$ ratio 152 that more closely approximates the exhaust composition from an internal combustion engine. Current systems typically use thermal energy to convert NO to $NO_2$, however such systems may have a deleterious effect on other desirable constituent components in the feed gas 110. The NO/$NO_2$ ratio adjustment system 100 beneficially permits the simulation of internal combustion engine exhaust having a various NO and $NO_2$ concentrations. The NO/$NO_2$ ratio adjustment system 100 additionally permits the testing of emissions control devices 220 at various NO and $NO_2$ concentrations and different NO/$NO_2$ ratios.

The combustion reactor 210 includes any number and/or combination of currently available or future developed systems and/or devices capable of combusting one or more fuel sources and one or more nitrogen sources to produce the feed gas 110 having the first, relatively high, $NO/NO_2$ ratio 112. In embodiments, the combustion reactor 210 may include a thermal oxidizer or similar system or device. In embodiments, the combustion reactor 210 may include a hot gas transient reactor system. In embodiments the combustion reactor 210 may be fueled using one or more hydrocarbon fuel sources, including: diesel fuel, gasoline, natural gas, propane, or combinations thereof. The combustion reactor 210 may have an operating temperature of: about 50° C. or more; about 100° C. or more; about 200° C. or more; about 300° C. or more; about 400° C. or more; about 500° C. or more; about 600° C. or more; or about 700° C. or more. The combustion reactor 210 may generate feed gas 110 at flow rates of up to: about 50 kilograms per hour (kg/hr); about 100 kg/hr; about 200 kg/hr; about 500 kg/hr; about 1000 kg/hr; about 2000 kg/hr; or about 3000 kg/hr.

The exhaust from the combustion reactor 210 forms all or a portion of the feed gas 110. However, the combustion of nitrogen containing compounds such as nitromethane and nitroethane 212 in the combustion reactor 210 produces primarily NO thus, the first $NO/NO_2$ ratio 112 in the feed gas from the combustion reactor is relatively high. The $NO/NO_2$ ratio adjustment system 100 uses a non-thermal plasma to oxidize or convert at least a portion of the NO present in a first portion 110A of the feed gas 110 to $NO_2$, beneficially providing an intermediate gas having a second $NO/NO_2$ ratio 132 that is very low relative to the original feed gas. A second portion 110B of the feed gas 110 (at the first $NO/NO_2$ ratio 112) is mixed with the intermediate gas 130 (at the second $NO/NO_2$ ratio 132) to provide an exit gas 150 having a defined third $NO/NO_2$ ratio 152 that is relatively low compared to the $NO/NO_2$ ratio 112 of the feed gas 110.

The $NO/NO_2$ ratio 152 in the exit gas 150 from the $NO/NO_2$ ratio adjustment system 100 may be adjusted by adjusting the quantity of feed gas 110 in the first feed gas portion 110A and in the second feed gas portion 110B to provide any desired $NO/NO_2$ ratio 152. The exit gas 150 from the $NO/NO_2$ ratio adjustment system 100 provides all or a portion of the gas to the emission control system 220.

The emission control system 220 may include any number and/or combination of currently available or future developed emission control systems and/or devices capable of chemically and/or thermally converting or altering one or more constituent components in an internal combustion engine exhaust. In embodiments, the emission control system 220 may include one or more catalytic emission control devices, one or more thermal emission control devices; or combinations thereof. In embodiments, the exhaust 230 generated by the emission control system 220 may be discharged to atmosphere or to a secondary treatment system such as a carbon dioxide capture or recovery system.

Figure 3:
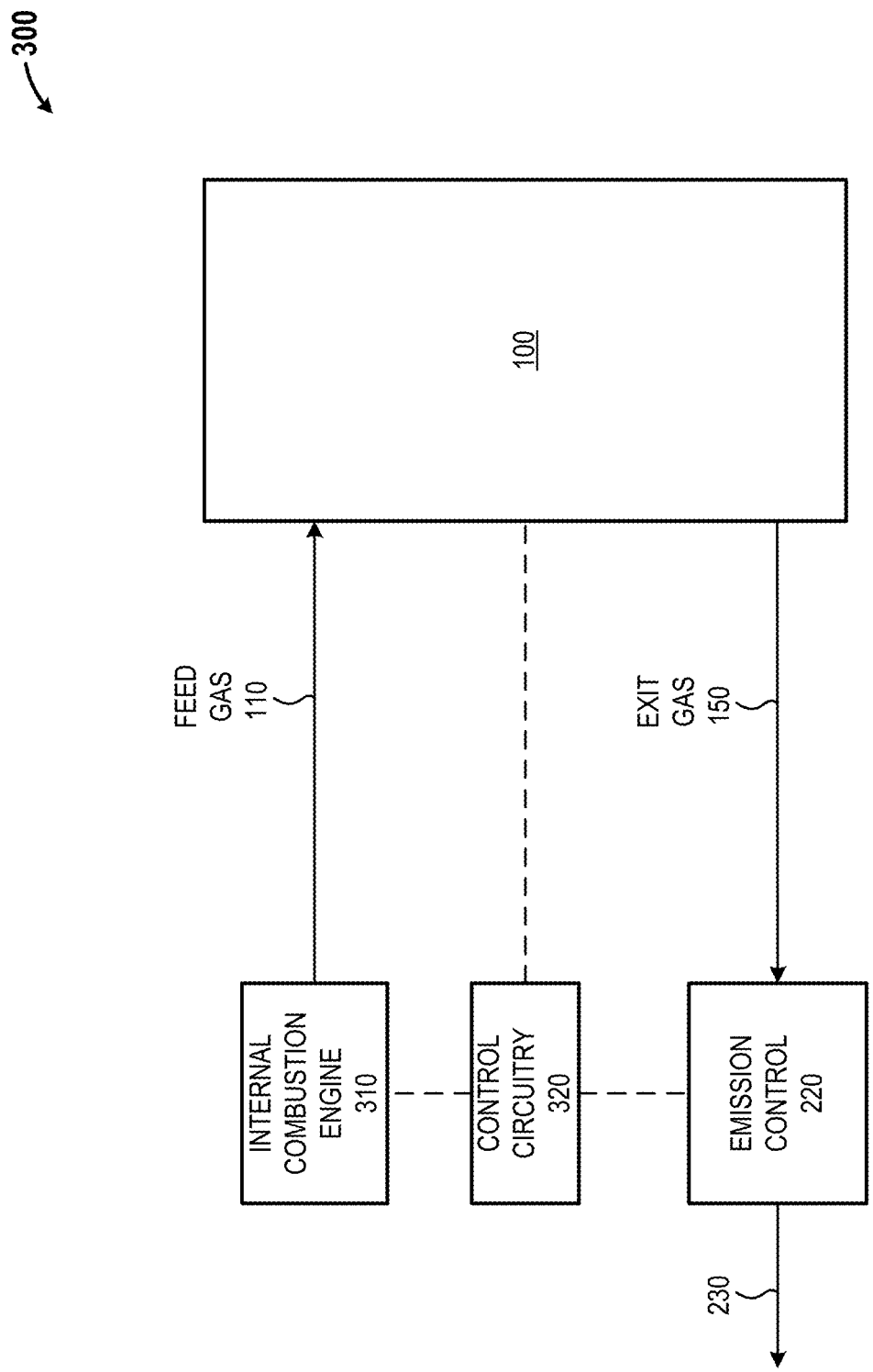
FIG. 3 is a block diagram of an illustrative internal combustion engine exhaust treatment system in which the exhaust from an internal combustion engine provides at least a portion of the feed gas to a NO/NO$_2$ ratio adjustment system that adjusts the NO/NO$_2$ ratio in the exhaust gas to improve the conversion and/or performance of the emission control system, in accordance with at least one embodiment described herein.

FIG. 3 is a block diagram of an illustrative internal combustion engine exhaust treatment system 300 in which the exhaust from an internal combustion engine 310 provides at least a portion of the feed gas 110 to a $NO/NO_2$ ratio adjustment system 100 that adjusts the exit $NO/NO_2$ ratio 152 in the exhaust gas to improve the conversion and/or performance of the emission control system 220, in accordance with at least one embodiment described herein. The exhaust generated by an internal combustion engine 310 may change over time as the result of wear and tear on the engine and may also be affected by the fuel, additives, and similar that may be added to the engine over the life of the engine. Each of these variables may cause the internal combustion engine 310 to produce an exhaust having a different profile. For example, as an internal combustion engine ages, the $NO/NO_2$ ratio may change. Changes in the $NO/NO_2$ ratio may adversely affect the performance of the emission control system 220 coupled to the internal combustion engine 310. The system 300 beneficially adjusts the $NO/NO_2$ ratio in the exhaust produced by the internal combustion engine 310 to improve the performance of the emission control system 220. In other embodiments, the performance of the emission control system 220 may change over time. For example, conversion efficiency of the emission control system 220 may deteriorate as the emission control system catalyst ages. To maintain the emission control system 220 at a desired level of efficiency, the $NO/NO_2$ ratio adjustment system 100 may adjust the $NO/NO_2$ ratio 152 in the exit gas 150 provided to the emission control system.

Control circuitry 320 may receive information and/or data from the internal combustion engine and/or the emission control system 220. In embodiments, the information received by the control circuitry 320 may include information indicative of an exhaust profile from the internal combustion engine. In embodiments, the information and/or data received by the control circuitry 320 may include information and/or data representative of the performance of the emission control system 220. Based at least in part on the information obtained from at least one of: the internal combustion engine 310 and/or the emission control system 220, the control circuitry 320 may alter or adjust the $NO/NO_2$ ratio in the exit gas 150 from the $NO/NO_2$ ratio adjustment system 100 to improve the performance and/or efficiency of the emission control system 220. In some implementation, the control circuitry 170 may provide all or a portion of the control circuitry 320.

Figure 4:
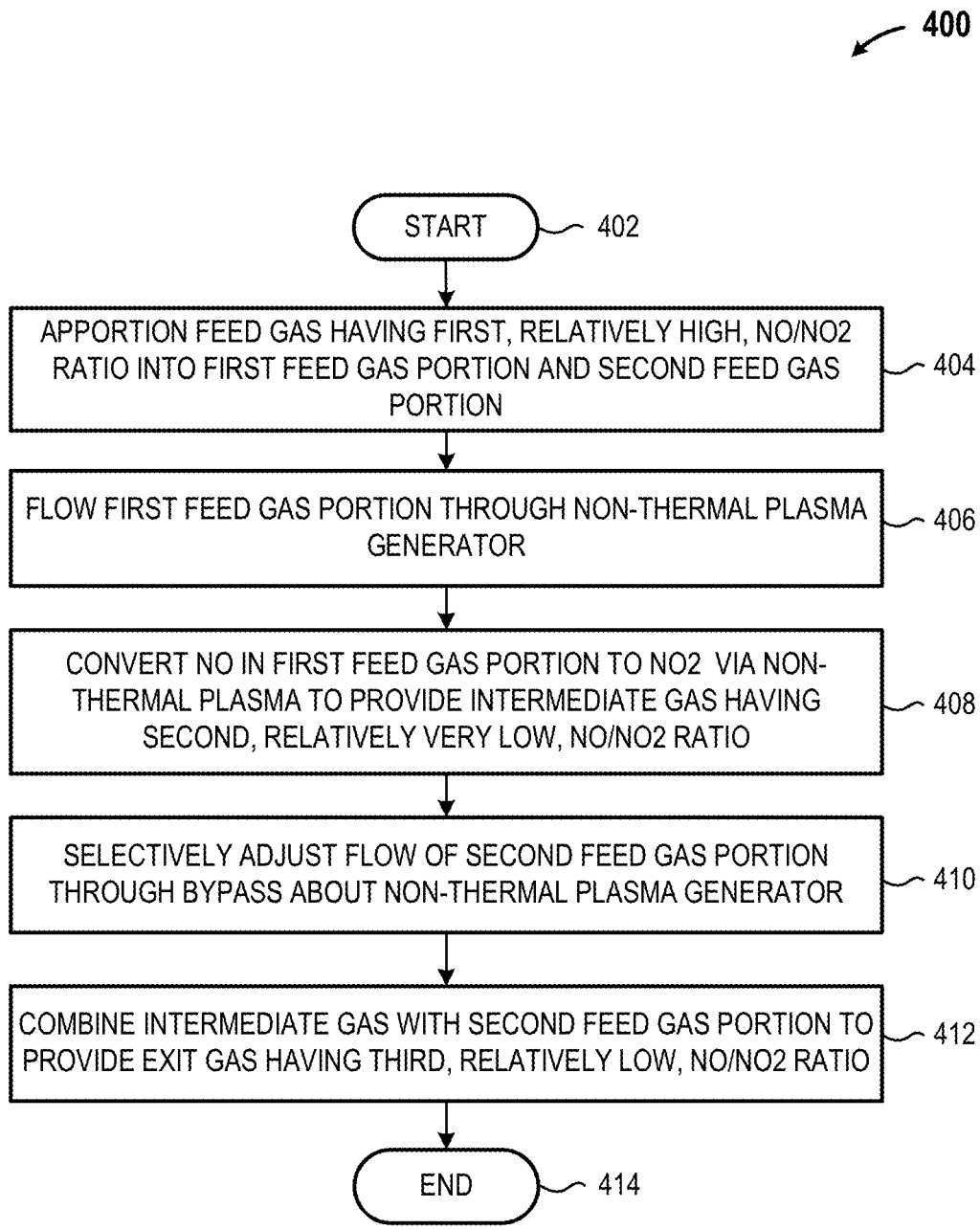
FIG. 4 is a flow diagram of an illustrative NO/NO$_2$ ratio adjustment method in which a non-thermal plasma generator converts at least a portion of a NO present in a first portion of a feed gas to NO$_2$ to provide an exit gas having a relatively low NO/NO$_2$ ratio, in accordance with at least one embodiment described herein.

FIG. 4 is a flow diagram of an illustrative $NO/NO_2$ ratio adjustment method 400 in which a non-thermal plasma generator 210 converts at least a portion of a NO present in a first portion of a feed gas 110A to $NO_2$, in accordance with at least one embodiment described herein. A feed gas 110 having a first, relatively high, $NO/NO_2$ ratio 112 is apportioned into a first feed gas portion 110A and a second feed gas portion 110B. The first feed gas portion 110A passes through a non-thermal plasma generator 120 that converts a portion of the NO present in the first feed gas portion 110A into $NO_2$, providing an intermediate gas 130 with a relatively very low $NO/NO_2$ ratio 132. The second feed gas portion 110B bypasses the non-thermal plasma generator 120 and is mixed with the intermediate gas 130 to form an exit gas 150 having a third, relatively low, $NO/NO_2$ ratio 152. The method commences at 402.

At 404, a feed gas 110 having a relatively high $NO/NO_2$ ratio 112 is collected and apportioned into a first feed gas portion 110A and a second feed gas portion 110B. In embodiments, the feed gas 110 may be apportioned by controlling the quantity of the feed gas 110 in the first feed gas portion 110A that flows through the non-thermal plasma generation system 120 using a second flow control element 180B disposed or positioned in the flow path of the non-thermal plasma generation system 120. In embodiments, the feed gas 110 may be apportioned by controlling the quantity of the feed gas 110 in the second feed gas portion 110B that flows through a bypass about the non-thermal plasma generation system 120 using a first flow control element 180A disposed or positioned in the bypass. In embodiments, at least a portion of the feed gas 110 may include a combustion reactor exhaust. In other embodiments, at least a portion of the feed gas 110 may include an internal combustion engine exhaust.

At 406, the first feed gas portion 110A, having the first, relatively high, NO/NO$_2$ ratio 112, flows through at least one non-thermal plasma generator 120.

At 408, at least a portion of the NO present in the first feed gas portion 110A is oxidized or otherwise converted to NO$_2$ as the first feed gas portion passes through the non-thermal plasma generation system 120. An intermediate gas 130 having a second, relatively very low, NO/NO$_2$ ration 132 exits the non-thermal plasma generation system 120.

At 410, control circuitry 170 selectively adjusts the flow of the second feed gas portion 110B through the bypass about the non-thermal plasma generation system 120. In embodiments, the control circuitry 170 may adjust the flow of the second feed gas portion 110B through the bypass based on a defined or desired NO/NO$_2$ ratio in the exit gas from the NO/NO$_2$ ratio adjustment system 100. In embodiments, the control circuitry 170 may adjust the flow of the second feed gas portion 110B through the bypass using a control valve or similar variable orifice final control element 180A.

At 412, the intermediate gas 130 having the second, relatively very low, NO/NO$_2$ ratio 132 is mixed or otherwise combined with the second feed gas portion 110B having the first, relatively high, NO/NO$_2$ ratio 112 to provide an exit gas 150 having a desired, third NO/NO$_2$ ratio 152 this is relatively low compared to the first NO/NO$_2$ ratio 112 in the feed gas. Beneficially, the exit gas 150 may have an NO/NO$_2$ ratio 152 that closely approximates the NO/NO$_2$ ratio in an internal combustion engine exhaust.

In embodiments, one or more gas analyzers 160 may be coupled to the exit gas to measure one or more of: the NO concentration; the NO$_2$ concentration; and/or the NO/NO$_2$ ratio in the exit gas 150. In embodiments, the gas analyzer 160 may generate one or more output signals 162 that include information and/or data indicative of one or more of the following: the NO concentration; the NO$_2$ concentration; and/or the NO/NO$_2$ ratio in the exit gas 150. The output signal 162 may be communicated to the control circuitry 170. Based, at least in part, on the output signal 162 received from the gas analyzer 160, the control circuitry 170 may generate a first control output signal 172A to control one or more output parameters of the first final control element 180A and/or a second control output signal 172B to control one or more output parameters of the second final control element 180B. The method 400 concludes at 414.

While FIG. 4 illustrates an LNG production process according to one or more embodiments, it is to be understood that not all of the operations depicted in FIG. 4 may be necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The systems and methods described herein beneficially provide an exit gas having a third, relatively low, NO/NO$_2$ ratio that closely approximates the NO/NO$_2$ ratio found in the exhaust of various internal combustion engines. The systems and methods described herein receive a feed gas having a first, relatively high NO/NO$_2$ ratio. The feed gas is apportioned into a first feed gas portion that is passed through a non-thermal plasma generation system to provide an intermediate gas having a second, relatively very low, NO/NO$_2$ ratio and a second feed gas portion having the first NO/NO$_2$ ratio. The intermediate gas and the second feed gas portion are combined to provide the exist gas having the third, relatively low, NO/NO$_2$ ratio. The systems and methods described herein beneficially provide an exit gas having a variable NO/NO$_2$ ratio to simulate exhaust from a variety of internal combustion engines.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A method to generate an exit gas having a defined exit NO/NO$_2$ ratio, the method comprising:
   apportioning a feed gas having a first NO/NO$_2$ ratio into a first feed gas portion and a second feed gas portion;
   flowing the first feed gas portion through a non-thermal plasma generator;
   converting, via the non-thermal plasma generator, at least a portion of NO present in the first feed gas portion to NO$_2$ to provide an intermediate gas having a second NO/NO$_2$ ratio;
   selectively adjusting a flow of the second feed gas portion through a bypass around the non-thermal plasma generator;
   combining the intermediate gas with the second feed gas portion to provide an exit gas having the defined exit NO/NO$_2$ ratio;
   wherein selectively adjusting the flow of the second feed gas portion through the bypass around the non-thermal plasma generator further comprises:
   measuring, by a gas analyzer, an NO/NO$_2$ ratio in the exit gas;
   determining, by control circuitry coupled to the gas analyzer, a flow of the second feed gas portion through the bypass to achieve the defined exit NO/NO$_2$ ratio, the flow of the second feed gas portion based on the measured NO/NO$_2$ ratio in the exit gas; and
   adjusting, by the control circuitry, the flow of the second feed gas portion to achieve the defined exit NO/NO$_2$ ratio.

2. The method of claim 1, further comprising generating, via an internal combustion engine, the first feed gas.

3. The method of claim 1, further comprising, generating, via a combustion reactor, the first feed gas.

4. The method of claim 1, further comprising generating, via a combustion reactor, the feed gas wherein the combustion reactor receives a fuel that includes at least one of: nitromethane or nitroethane.

5. The method of claim 1, wherein flowing the first feed gas portion through the non-thermal plasma generator comprises: flowing the first feed gas portion through the non-thermal plasma generator that generates a non-thermal plasma discharge via at least one of: DC glow discharge; radio frequency discharge; dielectric barrier discharge; atmospheric pressure plasma jet; and, microwave and pulsed power discharge typo plasma.

\* \* \* \* \*